United States Patent
Idupunur et al.

(10) Patent No.: US 10,593,214 B2
(45) Date of Patent: Mar. 17, 2020

(54) SYSTEM AND METHOD FOR REAL-TIME CLASSIFICATION OF NOTAMS MESSAGES

(71) Applicant: HONEYWELL INTERNATIONAL INC., Morris Plains, NJ (US)

(72) Inventors: Krishna Idupunur, Hyderabad (IN); Amit Srivastav, Bangalore (IN); Murali Krishna Kusuma, Hyderabad (IN); Shivaramakrishna Bupathi, Hyderabad (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 246 days.

(21) Appl. No.: 15/704,959

(22) Filed: Sep. 14, 2017

(65) Prior Publication Data

US 2019/0080617 A1    Mar. 14, 2019

(51) Int. Cl.
| | |
|---|---|
| *G08G 5/00* | (2006.01) |
| *G08B 7/06* | (2006.01) |
| *G08G 5/06* | (2006.01) |
| *G01C 23/00* | (2006.01) |
| *G08G 5/02* | (2006.01) |

(52) U.S. Cl.
CPC .......... *G08G 5/0021* (2013.01); *G01C 23/00* (2013.01); *G08B 7/06* (2013.01); *G08G 5/0013* (2013.01); *G08G 5/0052* (2013.01); *G08G 5/0091* (2013.01); *G08G 5/065* (2013.01); *G08G 5/0065* (2013.01); *G08G 5/025* (2013.01)

(58) Field of Classification Search
CPC .. G08G 5/0021; G08G 5/0013; G08G 5/0091; G08G 5/065; G08G 5/0052; G08G 5/025; G08G 5/0065; G08B 7/06; G01C 23/00
See application file for complete search history.

(56) References Cited

U.S. PATENT DOCUMENTS

| | | | |
|---|---|---|---|
| 8,024,078 B2 | 9/2011 | Coulmeau et al. | |
| 8,723,686 B1 * | 5/2014 | Murray | G08G 5/0039 340/901 |
| 8,970,399 B1 | 3/2015 | Zimmer et al. | |

(Continued)

FOREIGN PATENT DOCUMENTS

EP    2574965 A2    4/2013

OTHER PUBLICATIONS

Zimmer, Nico, et al.. "Rule-Based Notam & Weather Notification," IEEE Explorer, Jun. 2011.

(Continued)

*Primary Examiner* — Mussa A Shaawat
(74) *Attorney, Agent, or Firm* — Lorenz & Kopf, LLP

(57) ABSTRACT

Methods and systems are provided for classifying notice to airmen (NOTAM) alerts to a pilot of an aircraft. First, bundled NOTAMs are received during the flight planning process for the aircraft. A domain rules set for a filter engine on board the aircraft is created that prioritizes the bundled NOTAMs based on their criticality. The domain rules set is updated with weather data and day/night visibility analysis. The prioritized critical NOTAMs are stored on board in an electronic database and retrieved during the relevant phase of the flight path of the aircraft. The NOTAM messages are then displayed to the pilot on a graphical display device on board the aircraft.

14 Claims, 3 Drawing Sheets

(56) References Cited

U.S. PATENT DOCUMENTS

| | | |
|---|---|---|
| 2011/0264313 A1 | 10/2011 | Sampath |
| 2012/0209458 A1 | 8/2012 | Sampath |
| 2012/0274484 A1* | 11/2012 | Zimmer ............... G08G 5/0091 340/945 |
| 2013/0027226 A1* | 1/2013 | Cabos ................. G08G 5/0013 340/961 |
| 2013/0179792 A1* | 7/2013 | Alter ..................... H04L 67/125 715/734 |
| 2015/0002316 A1* | 1/2015 | Sridhar ................. B64D 43/00 340/953 |
| 2016/0093218 A1* | 3/2016 | Hale ...................... G08G 5/003 701/120 |
| 2016/0093219 A1* | 3/2016 | Bailey ................. G08G 5/0013 701/120 |
| 2016/0093222 A1* | 3/2016 | Hale ................... G08G 5/0039 701/120 |
| 2016/0111007 A1* | 4/2016 | Dennerline .......... G08G 5/0034 701/528 |
| 2016/0125744 A1* | 5/2016 | Shamasundar ...... G08G 5/0039 701/122 |
| 2016/0133138 A1* | 5/2016 | Oldach ................. G08G 5/025 701/16 |
| 2016/0209234 A1* | 7/2016 | Passinger ............... B64D 43/00 |
| 2016/0217693 A1 | 7/2016 | Samuthirapandian et al. |
| 2018/0075757 A1* | 3/2018 | Estes ................... G08G 5/0013 |

OTHER PUBLICATIONS

Extended EP Search Report for Application No. 18192333.5-1216 dated Feb. 14, 2019.

\* cited by examiner

SYSTEM AND METHOD FOR REAL-TIME CLASSIFICATION OF NOTAMS MESSAGES

TECHNICAL FIELD

The present invention generally relates to aircraft communications, and more particularly relates to a method for real-time classification of notice to airmen (NOTAM) messages.

BACKGROUND

A notice to airmen or "NOTAM" is a standard message that alerts a pilot to conditions along all flight route or at a location of interest. These messages are traditionally available in text formats in either a printed or digitized version and they are a standard part of a preflight planning and briefing. However, a standard textual NOTAM summary to a pilot may typically range between 10-50 pages per flight. Since pilots may be under tight time constraints and have additional important duties and checks prior to a flight, it is advantageous to prioritize and categorize NOTAMs. Hence, there is a need for a system and method for real-time classification of NOTAM messages.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A method is provided for classification of notice to airmen (NOTAM) alerts to a pilot of an aircraft. The method comprises: receiving bundled NOTAMs during flight path planning of the aircraft; creating a domain rules set for a filter engine on board the aircraft, where the domain rules set prioritizes the bundled NOTAMs based on criticality; filtering the bundled NOTAMs with the filter engine, where the domain rules set of the filter engine is updated with weather data and day/night visibility analysis; storing the prioritized critical NOTAMs in a retrievable electronic database on board the aircraft; retrieving each prioritized critical NOTAM during its' respective relevant phase of the flight path of the aircraft; and displaying the prioritized critical NOTAM to the pilot on a graphical display device on board the aircraft.

A system is provided for classification of notice to airmen (NOTAM) alerts to a pilot of an aircraft. The system comprises: a source of bundled NOTAMs that is external to the aircraft; a filter engine located on board the aircraft that receives, unpacks and prioritizes the bundled NOTAMs according to a domain rules set loaded on the filter engine; a retrievable electronic database on board the aircraft that stores the prioritized critical NOTAMs for later retrieval during a relevant phase of flight operations of the aircraft; and an electronic display device on board the aircraft that displays the prioritized critical NOTAMs to a crewmember of the aircraft.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any day embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

A system and method for classifying NOTAMs for a pilot of an aircraft has been developed. In some embodiments, bundles of NOTAMs are received during the flight planning of an aircraft while on the ground. A domain rules set for a filter engine is created that will prioritize the bundled NOTAMs based on the criticality of their content. The filter engine and its rules set are updated with weather data and day/night visibility analysis. After the filtered engine prioritizes the critical NOTAMs they are packed and stored in a retrievable electronic database on board the aircraft. Each prioritized critical NOTAM is then retrieved and displayed on a graphical display device for the pilot during the relevant phase of the flight of the aircraft so that the pilot does not miss any critical.

Figure 1:
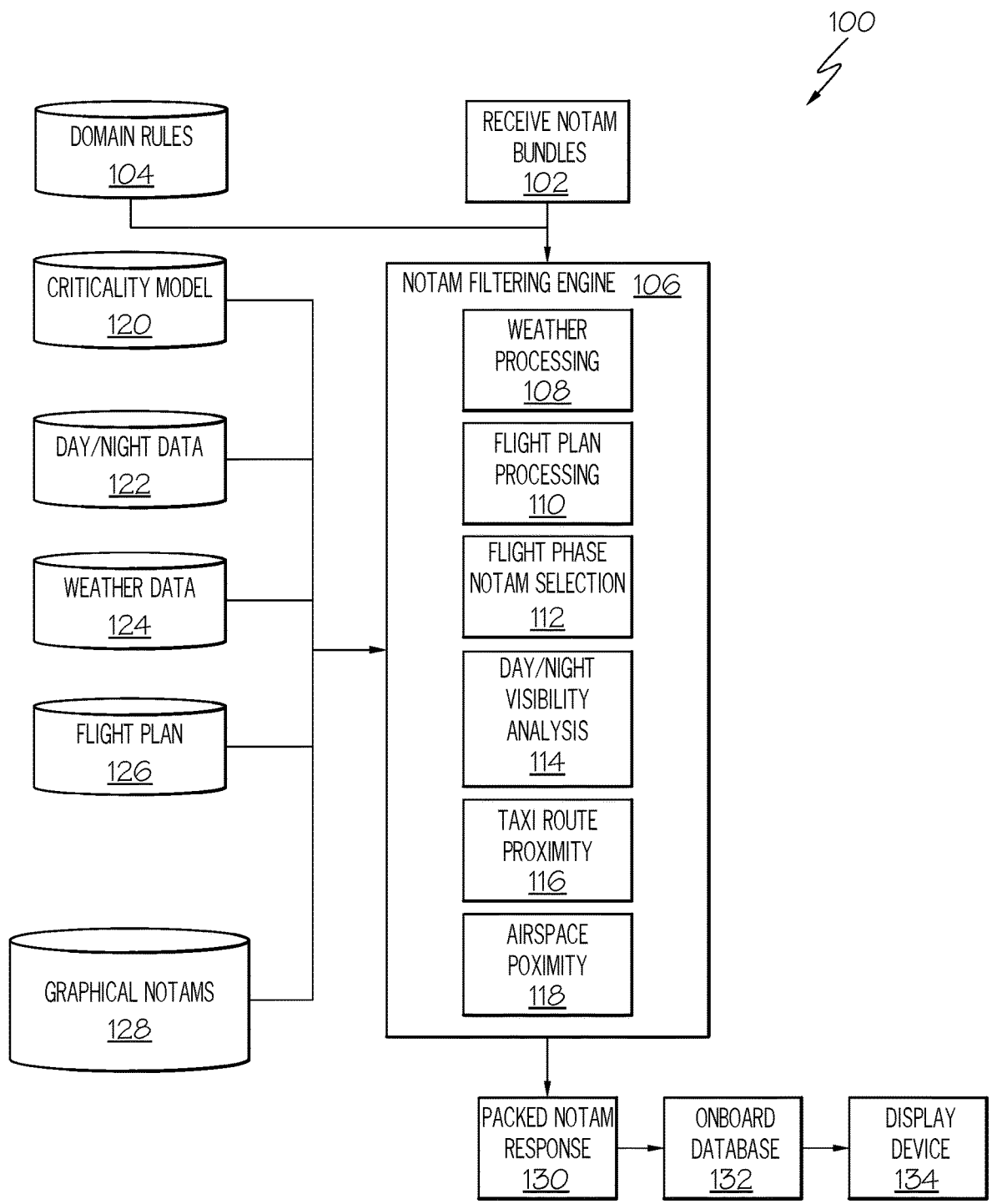
FIG. 1 shows a block diagram of a system for filtering and delivery of critical NOTAMs in accordance with one embodiment.

Turning now to FIG. 1, a block diagram of a system 100 for filtering and delivery of critical NOTAMs is shown in accordance with one embodiment. First, a bundle of NOTAMs 102 along with the domain rules set 104 are received and loaded onto the NOTAM filtering engine 106. The filtering engine 106 will process the bundled NOTAMs according to the domain rules set 104. The NOTAMs will be processed for: weather data 108; flight plan processing 110; flight phase selection for each NOTAM 112; day/night visibility analysis 114; taxi route proximity 116; and airspace proximity (both horizontal and vertical) 118.

Supporting data for updating the domain rules set for the filtering engine is loaded from: a criticality model database 120; a day/night database 122; a current and forecast weather database 124; the flight plan for the aircraft 126; and a graphical NOTAMs database 128. Once the NOTAMs are filtered, they are packed according to their relevant flight phase 130 and stored in an onboard retrievable electronic database 132. During the appropriate phase of the flight, the appropriate NOTAMs are retrieved and shown to the aircrew on a graphical display device 134. The graphical display device may be a certified piece of equipment on board the aircraft. In other embodiments, the graphical display device may be a non-certified piece of equipment used by an aircrew member such as a personal mobile phone or personal tablet.

In some embodiments, the weather processing 108 includes all meteorological terminal aviation routine (METAR) or equivalent related weather data that is valid for the phase of the flight for a particular NOTAM. This data is processed and used to identify the impact of weather on the flight to include such things as runway visibility, etc. The flight plan processing 110 includes flight plan details that are extracted to identify the airports, airspace and specific geographic regions that are subject to an individual NOTAM. The day/night visibility processing 114 is used to identify individual NOTAMs that are affected by the current and future visibility computations. The taxi route proximity processing 116 identifies specific NOTAMs that are affected by aerodrome elements of the taxi route. The airspace proximity processing 118 determines both vertical and horizontal airspace restrictions for a particular flight plan based the current aircraft position and remaining aircraft flight trajectory. The criticality module 120 computes the overall importance of each individual NOTAM based on the importance of all the modules according to the domain rules 104. These prioritized critical NOTAMs are then matched with the relevant flight phase 112. Examples of different flight phases include: preflight preparation and planning; taxiing; take off; en-route flight; approach; and landing.

Figure 2:
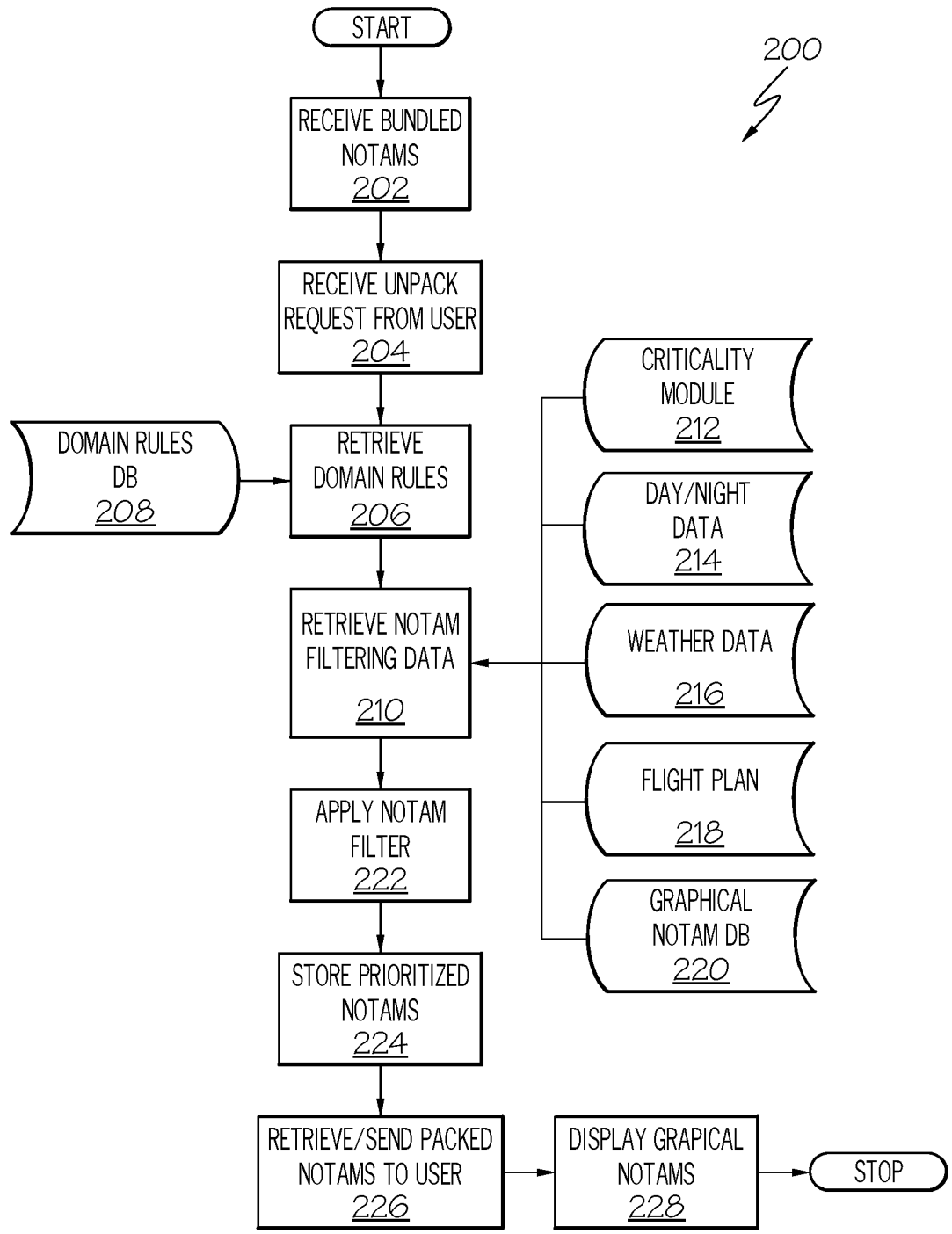
FIG. 2 shows a flowchart for a method of filtering and delivery of critical NOTAMs in accordance with one embodiment.

Turning now to FIG. 2, a flowchart of a method 200 for filtering and delivery of critical NOTAMs is shown in accordance with one embodiment. First, bundled NOTAMs 202 are received along with an unpack request from a user 204. The domain rules set for the filter engine are retrieved 206 from an external domain rules database 208. The filter engine then retrieves data from external sources 210 to update the domain rules set including: a criticality module 212; day/night data 214; weather data 216; a flight plan for the aircraft 218; and graphical NOTAMs 220. The filter engine prioritizes the NOTAMs 222 based on criticality. The prioritized and unpacked critical NOTAMs are stored on a retrievable electronic database on board the aircraft 224. During the relevant flight phase of the aircraft, the relevant NOTAMs are retrieved 226 and sent to a graphical display device for the aircrew 228.

Figure 3:
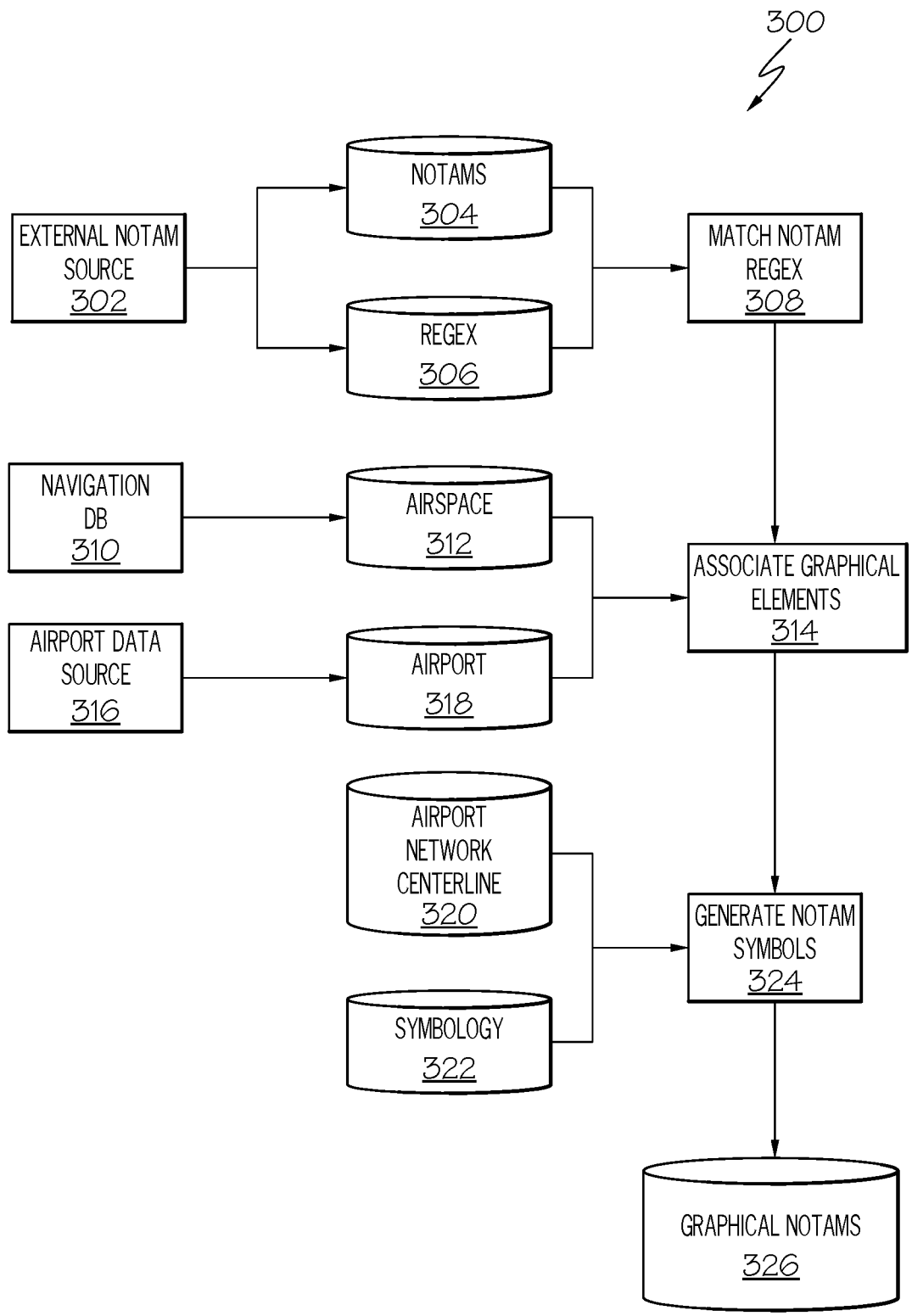
FIG. 3 shows a block diagram of the creation of a graphical NOTAM database in accordance with one embodiment.

Turning now to FIG. 3, a block diagram is shown illustrating the creation of a graphical NOTAM database in accordance with one embodiment. First, an external source 302 provides the NOTAMs 304 that are matched with regular textual expressions (RegEx) 308 from a reference RegEx database 306. Next, graphical elements for the airspace 312 are retrieved from a navigational database 310 and graphical elements for an airport 318 are also retrieved from the airport data source 316. These graphical elements are associated with the text expressions of the NOTAMs 314. Symbols for the graphical elements are then retrieved from an airport network centerline database 320 and a symbol database 322. The symbols used to generate NOTAMs symbols 324 that are stored in an electronic graphical NOTAM database for later retrieval 326.

In some embodiments, NOTAMs are monitored, identified, parsed and made available from external sources including: a flight data center; digital messages; international civil aviation organization (ICAO) messages, etc. These messages are received as a bundle and matched with NOTAMs RegEx patterns from an electronic database. Based on standard pattern matching techniques, each NOTAM is classified and associated with graphical elements of airspace and airport networks. Symbols for graphical representation of the NOTAM contents are based on the notification type (e.g., runway closure) and are picked from a standard symbology database containing symbols of affected aerodrome elements. Airport network centerline data is used to map symbols affected aerodrome elements. The centerline of such aerodrome elements may include runways, taxiways aprons, gates, etc. Finally, the textual NOTAMs, the associated graphical elements and the generated symbols are combined and stored in the graphical NOTAMs database. The contents of this database may be updated and/or deleted as necessary.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for classification of notice to airmen (NOTAM) alerts to a pilot of an aircraft, comprising:
   receiving bundled NOTAMs during flight path planning of the aircraft;
   creating a domain rules set for a filter engine on board the aircraft, where the domain rules set prioritizes the bundled NOTAMs based on criticality;
   filtering the bundled NOTAMs with the filter engine, where the rules set of the filter engine is updated with weather data and day/night visibility analysis;
   matching each bundled NOTAM to a regular textual expression;
   associating graphical elements to each bundled NOTAM according to its regular textual expression; and
   creating a prioritized graphical NOTAM using the associated graphical elements, where the prioritized graphical NOTAM utilizes graphical symbols retrieved from an electronic symbol database;
   storing the prioritized critical graphical NOTAMs in a retrievable electronic database on board the aircraft;
   retrieving each prioritized critical graphical NOTAM during its' respective relevant phase of the flight path of the aircraft; and
   displaying the prioritized critical graphical NOTAM to the pilot on a graphical display device on board the aircraft.

2. The method of claim 1, where the domain rules set of the filter engine is updated with taxi route proximity data.

3. The method of claim 1, where the domain rules set of the filter engine is updated with airspace proximity data.

4. The method of claim 3, where the airspace proximity data is horizontal airspace.

5. The method of claim 4, where the airspace proximity data is vertical airspace.

6. The method of claim 1, where the associated graphical elements represent airspace features.

7. The method of claim 6, where the airspace features are retrieved from a navigational database.

8. The method of claim 1, where the associated graphical elements represent airport features.

9. The method of claim 8, where the airport features are retrieved from an airport data source.

10. The method of claim 1, where the graphical NOTAM is displayed on a certified pilot display device.

11. The method of claim 1, where the graphical NOTAM is displayed on a non-certified pilot display device.

12. A system for classification of notice to airmen (NOTAM) alerts to a pilot of an aircraft, comprising:
   a source of bundled NOTAMs that is external to the aircraft;
   a filter engine located on board the aircraft that receives, unpacks and prioritizes the bundled NOTAMs according to a domain rules set loaded on the filter engine:
   an electronic symbol database that provides graphical symbols that are matched to a regular textual expression of each bundled NOTAM;
   a graphical NOTAM database that stores a prioritized graphical NOTAM that is created by using graphical symbols that matched to each bundled NOTAM;
   a retrievable electronic database on board the aircraft that stores the prioritized critical graphical NOTAMs for later retrieval during a relevant phase of flight operations of the aircraft; and
   an electronic display device on board the aircraft that displays the prioritized critical graphical NOTAMs to a crewmember of the aircraft.

13. The system of claim 12, where the electronic display device is a certified pilot display device.

14. The system of claim 12, where the electronic display device is a non-certified pilot display device.

* * * * *